United States Patent
Rhee et al.

[11] Patent Number: 6,160,945
[45] Date of Patent: Dec. 12, 2000

[54] OPTICAL WAVEGUIDE DEVICE FOR LOSS ABSORPTION AND FABRICATION METHOD THEREOF

[75] Inventors: Tae-hyung Rhee, Sungnam; Woo-hyuk Jang, Yongin; Eun-ji Kim; Yong-woo Lee, both of Seoul, all of Rep. of Korea

[73] Assignee: SamSung Electronics Co., Ltd., Kyungki-do, Rep. of Korea

[21] Appl. No.: 09/153,147

[22] Filed: Sep. 14, 1998

[30] Foreign Application Priority Data

Sep. 12, 1997 [KR] Rep. of Korea .................. 97 47214

[51] Int. Cl.[7] ........................... G02B 6/10; C03B 37/023
[52] U.S. Cl. .................. 385/129; 385/14; 385/130; 385/131; 385/132; 65/385; 65/386
[58] Field of Search ........................ 385/1, 2, 3, 14, 385/123, 129, 130, 131, 132; 65/385, 386

[56] References Cited

U.S. PATENT DOCUMENTS

| | | | |
|---|---|---|---|
| 3,659,916 | 5/1972 | Marcatili | 385/132 X |
| 5,339,370 | 8/1994 | Sano et al. | 385/2 |
| 5,483,609 | 1/1996 | Nakaya | 385/29 |
| 5,778,112 | 7/1998 | Hwang et al. | 385/2 |
| 5,784,188 | 7/1998 | Nakamura et al. | 385/2 X |
| 6,008,926 | 12/1999 | Moodie et al. | 359/238 |

FOREIGN PATENT DOCUMENTS

| | | | |
|---|---|---|---|
| 59-019907 | 2/1984 | Japan | 385/132 X |
| 62-145209 | 6/1987 | Japan | 385/132 X |
| 2-90109 | 3/1990 | Japan | 385/132 X |
| 2-257107 | 10/1990 | Japan | 385/14 X |
| 3-188402 | 8/1991 | Japan | 385/132 X |
| 4-9807 | 1/1992 | Japan | 385/132 X |
| 4-12333 | 1/1992 | Japan | 385/132 X |
| 4-152306 | 5/1992 | Japan | 385/132 X |
| 4-235505 | 8/1992 | Japan | 385/132 X |
| 4-235506 | 8/1992 | Japan | 385/132 X |
| 5-66435 | 3/1993 | Japan | 385/132 X |
| 5-215926 | 8/1993 | Japan | 385/132 X |
| 6-208033 | 7/1994 | Japan | 385/132 X |
| 9-178968 | 7/1997 | Japan | 385/132 X |
| 10-239542 | 9/1998 | Japan | 385/132 X |

*Primary Examiner*—Brian Healy
*Attorney, Agent, or Firm*—Robert E. Bushnell, Esq.

[57] ABSTRACT

An optical waveguide device for loss absorption, and a fabrication method thereof, are provided. The optical waveguide device for loss absorption includes: a substrate of a predetermined material; a lower cladding formed on the substrate; an optical waveguide formed on the lower cladding, and formed of a material having a refractive index greater than a refractive index of the lower cladding; an upper cladding formed so as to completely cover the optical waveguide; and an absorption layer formed of a material having refractive index greater than a refractive index of the upper cladding, and formed on the upper cladding to a thickness which can absorb a reflected or radiated optical signal. As described above, an absorption layer capable of absorbing light is formed in the waveguide device upon fabricating the optical waveguide, thus minimizing or removing loss due to reflection and radiation of an optical signal.

19 Claims, 6 Drawing Sheets

OPTICAL WAVEGUIDE DEVICE FOR LOSS ABSORPTION AND FABRICATION METHOD THEREOF

CLAIM OF PRIORITY

This application makes reference to, incorporates the same herein, and claims all benefits accruing under 35 U.S.C. §119 from an application for OPTICAL WAVEGUIDE DEVICE FOR LOSS ABSORPTION AND FABRICATION METHOD THEREOF earlier filed in the Korean Industrial Property Office on the 12$^{th}$ of September 1997 and there duly assigned Ser. No. 47214/1997.

BACKGROUND OF THE INVENTION

1. Technical Field

The present invention relates to an optical waveguide device and a fabrication method thereof and, more particularly, to an optical waveguide device which absorbs and removes optical reflection loss and radiation loss, and a fabrication method thereof.

2. Related Art

Minimizing reflection loss in every optical communications device is important to improve means of the characteristics of the device. In particular, in a planar waveguide, pigtailing reflection loss is reduced by polishing or cutting cross-sections of both an optical waveguide device and an optical fiber array block at a predetermined angle. In the case of an optical waveguide device having a large curvature, interference due to radiation of an optical signal also can distort an optical signal of the device.

For example, in a planer waveguide device and an optical fiber array module, an optical fiber is connected via a junction to a portion of the device polished at a predetermined angle to reduce reflection loss. However, this method requires a careful attention to the fabrication method, and is expensive. In addition, it is not possible to use some planer waveguide devices because they can not be polished.

SUMMARY OF THE INVENTION

To solve the above problems, it is an objective of the present invention to provide an optical waveguide device for loss absorption, wherein the device has an absorption layer deposited thereon to reduce to some extent the undesired interference of an optical signal by absorbing a reflected or radiated optical signal, and a fabrication method thereof.

Accordingly, to achieve the above objective, there is provided an optical waveguide device for loss absorption, comprising: a substrate of a predetermined material; a lower cladding formed on the substrate; an optical waveguide formed on the lower cladding, and formed from a material having a higher refractive index than the lower cladding; an upper cladding formed to be capable of completely covering the optical waveguide; and an absorption layer formed from a material having a higher refractive index than the upper cladding, and formed to a thickness which can absorb a reflected or radiated optical signal on the upper cladding.

To achieve the above objective, there is provided an optical waveguide device for loss absorption, comprising: a substrate of a predetermined material; an absorption layer formed on the upper cladding and formed to a thickness which can absorb a reflected or radiated optical signal; a lower cladding formed on the absorption layer, and formed from a material having a lower refractive index than the absorption layer; an optical waveguide formed on the lower cladding, and formed from a material having a higher refractive index than the lower cladding; and an upper cladding formed to be capable of completely covering the optical waveguide.

To achieve the above objective, there is provided a method of fabricating an optical waveguide device for loss absorption, comprising the steps of: depositing a lower cladding on a planar substrate; depositing a core layer having a higher refractive index than the lower cladding on the resultant structure; forming an optical waveguide by patterning the core layer and etching the core layer along the pattern; depositing an upper cladding to surround the optical waveguide; and forming an absorption layer by depositing a material having a higher refractive index than the upper cladding on the resultant structure.

To achieve the above objective, there is provided a method of fabricating an optical waveguide device for loss absorption, comprising the steps of: depositing an absorption layer on a planar substrate; depositing a lower cladding on the absorption layer, the lower cladding being of a material having a lower refractive index than the absorption layer; depositing a core layer having a higher refractive index than the lower cladding on the resultant structure; forming an optical waveguide by patterning the core layer and etching the core layer along the pattern; and depositing an upper cladding to surround the optical waveguide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
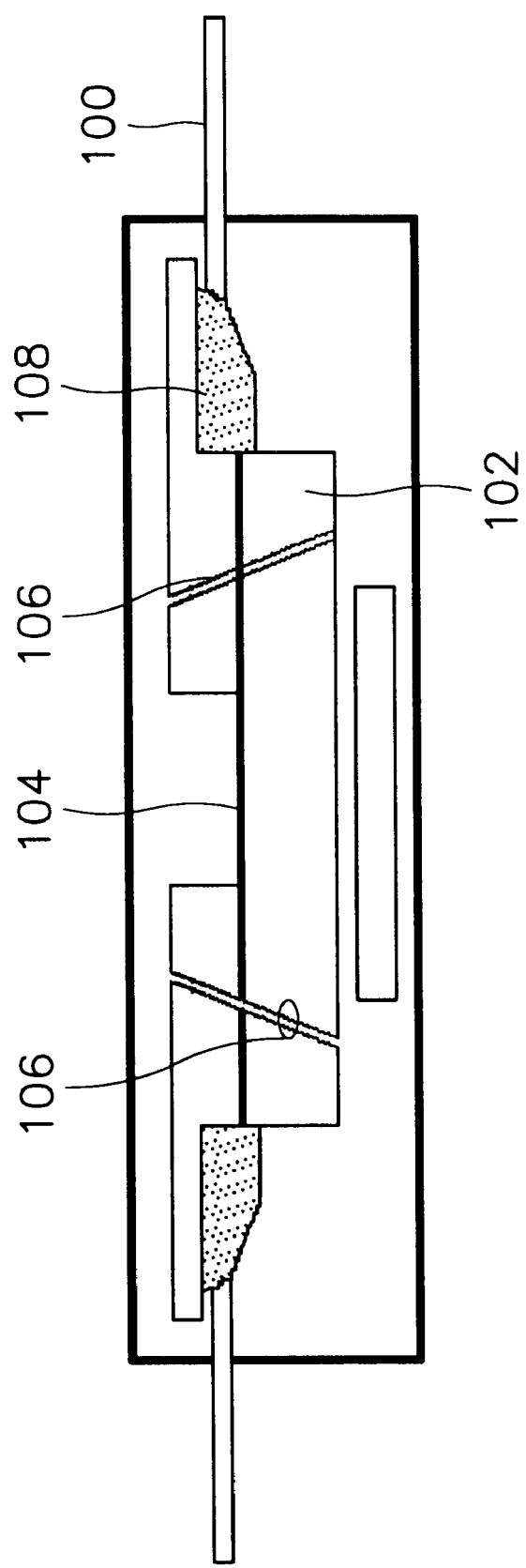
FIG. 1 shows the arrangement structure of a planar waveguide and an optical fiber array module.

FIG. 1 shows the arrangement structure of a planar waveguide device and an optical fiber array module. All cross-sections of the planar waveguide device and optical fiber array module shown in FIG. 1 are polished at a predetermined angle to remove reflection loss. Referring to FIG. 1, element 100 is an optical fiber, element 102 is an optical fiber array module, element 104 is a planar waveguide device, element 106 is a portion polished at a predetermined angle to reduce the reflection loss, and element 108 is an adhesive.

However, this method requires careful attention in the fabrication method and it is expensive. Also, it is not possible to use some planar waveguide devices that cannot be polished.

Figure 2A:
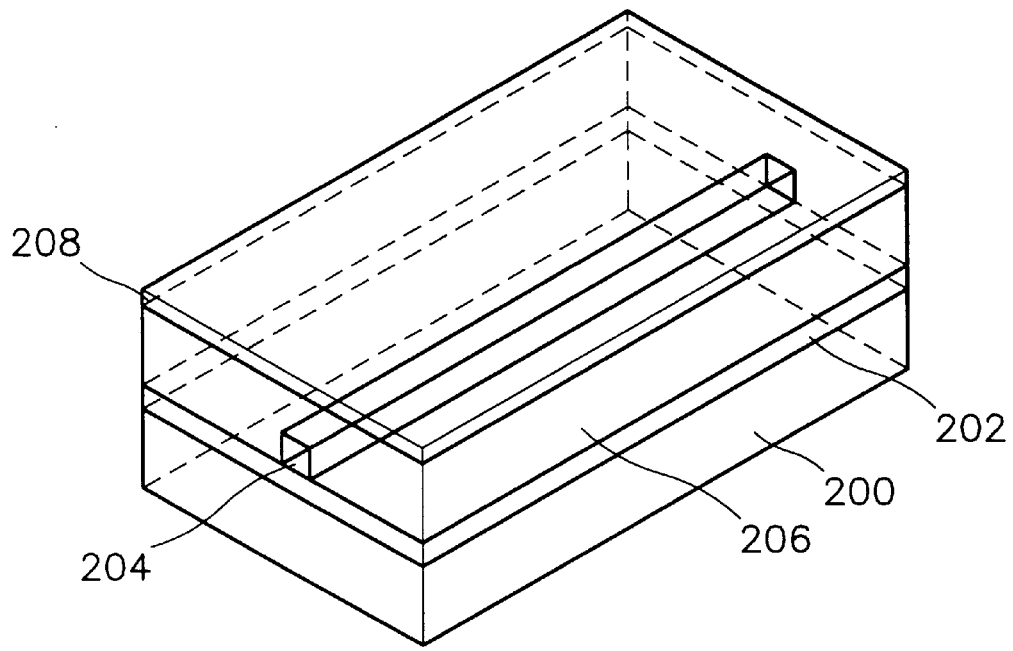
FIGS. 2A and 2B show embodiments of an optical waveguide device for loss absorption according to the present invention.

Referring to FIG. 2A, an optical waveguide device according to an embodiment of the present invention is comprised of a substrate 200, a lower cladding 202 formed on the substrate 200, an optical waveguide 204 formed on the lower cladding 202, an upper cladding 206 covering the optical waveguide 204, and an absorption layer 208 formed on the upper cladding 206.

Figure 2B:
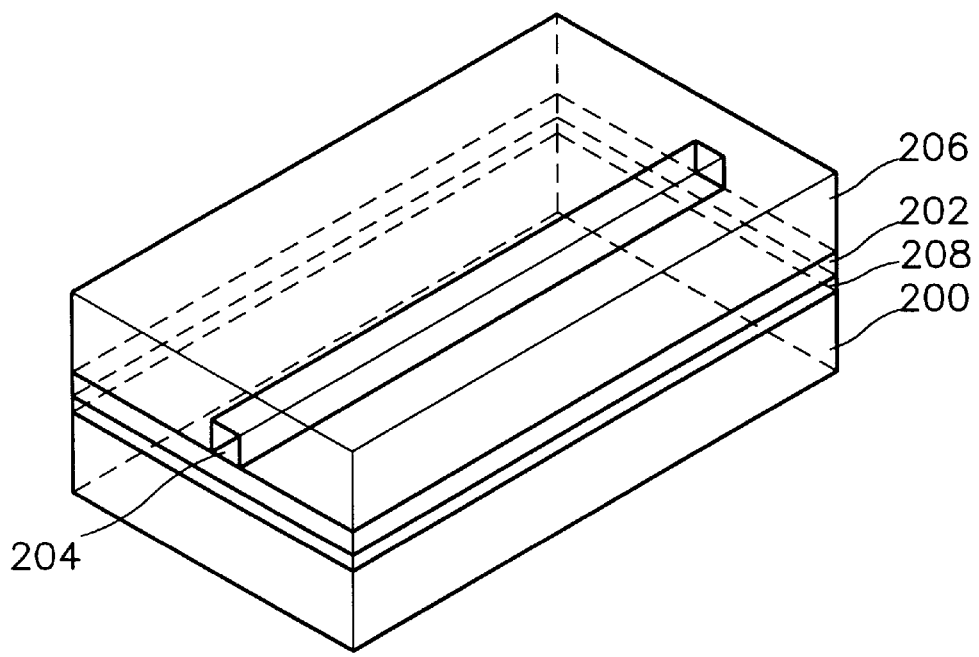

Referring to FIG. 2B, an optical waveguide device according to another embodiment of the present invention is comprised of a substrate 200, an absorption layer 208 formed on the substrate 200, a lower cladding 202 formed on the absorption layer 208, an optical waveguide 204 formed on the lower cladding 202, and an upper cladding 206 covering the optical waveguide 204. It is preferable that the thickness of the absorption layer 208 be at least 0.2 $\mu$m.

The substrate 200 is made of a material having excellent surface flatness, such as silicon or glass. Preferably, the lower cladding 202 and upper cladding 206 are formed of a material having optical transparency which transmits an optical signal without loss at a communications wavelength. The optical waveguide 204 is formed of a material having a larger refractive index than the lower cladding 202 and upper cladding 206, and waveguide lights. The absorption layer 208 is formed of a material having substantial travel loss for an optical signal at a communications wavelength and a higher refractive index than the lower cladding 202 and upper cladding 206. Preferably, the absorption layer 208 is formed of a material including a hydroxyl function group, a carboxyl function group, and a first or second Amin function group. Also, it is preferable that the absorption layer 208 be formed of a material including 10% or less of a halogen family element. A material including a minimal amount of unsaturated carbon necessary to provide stable thermal properties is also desirable from the standpoint of fabrication.

FIGS. 3A through 3F are perspective views illustrating a process for fabricating an optical waveguide for loss absorption according to the present invention.

Figure 3A:
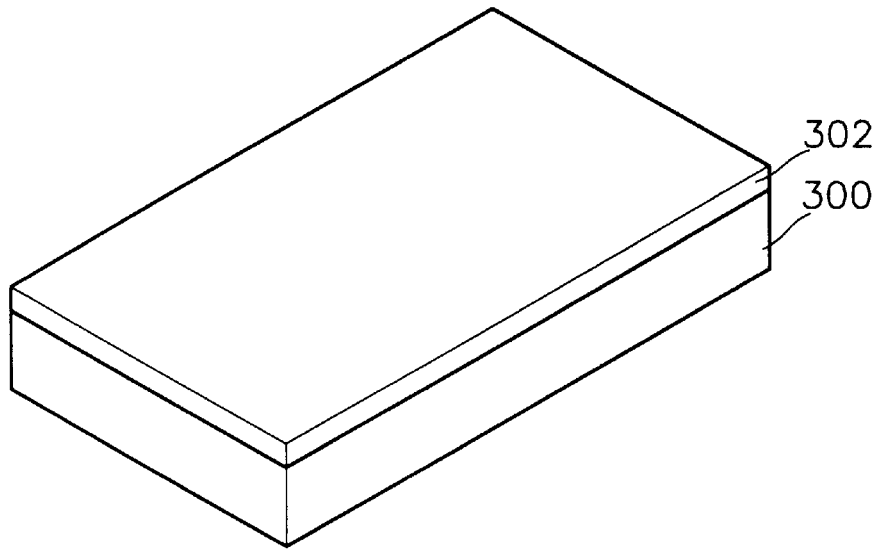
FIGS. 3A through 3F are perspective views illustrating a process for fabricating an optical waveguide for loss absorption according to the present invention.
Figure 3B:
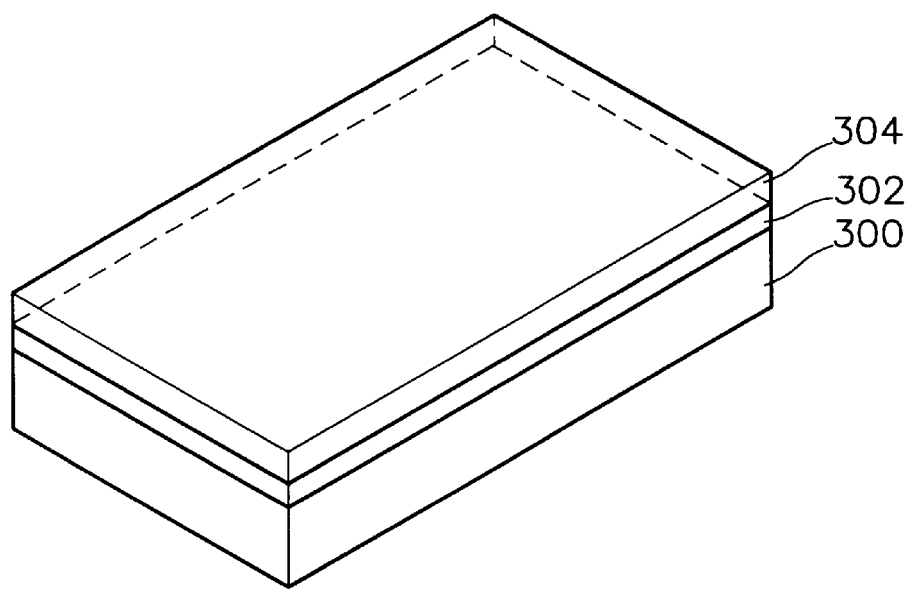
Figure 3C:
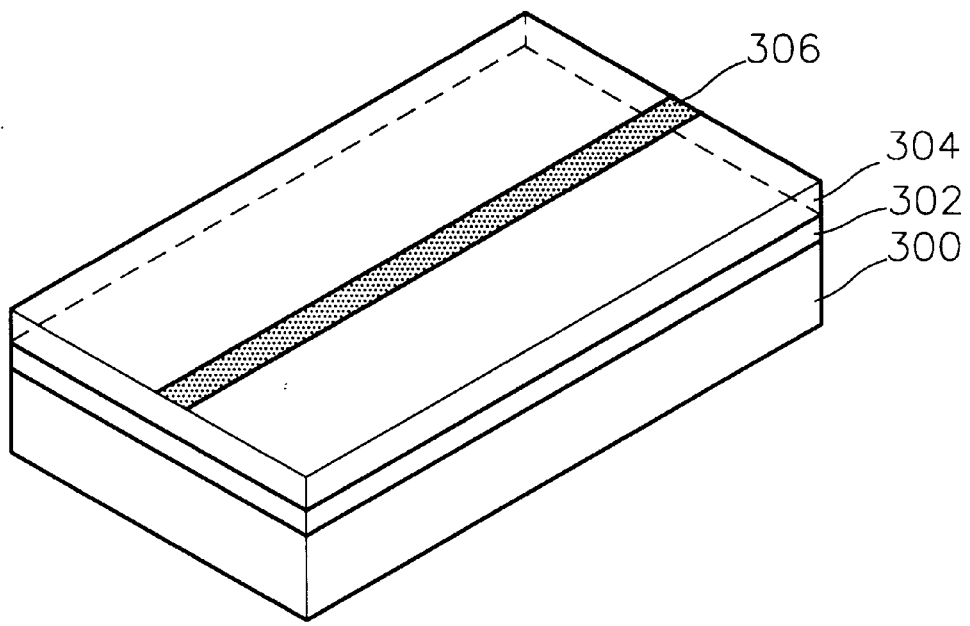
Figure 3D:
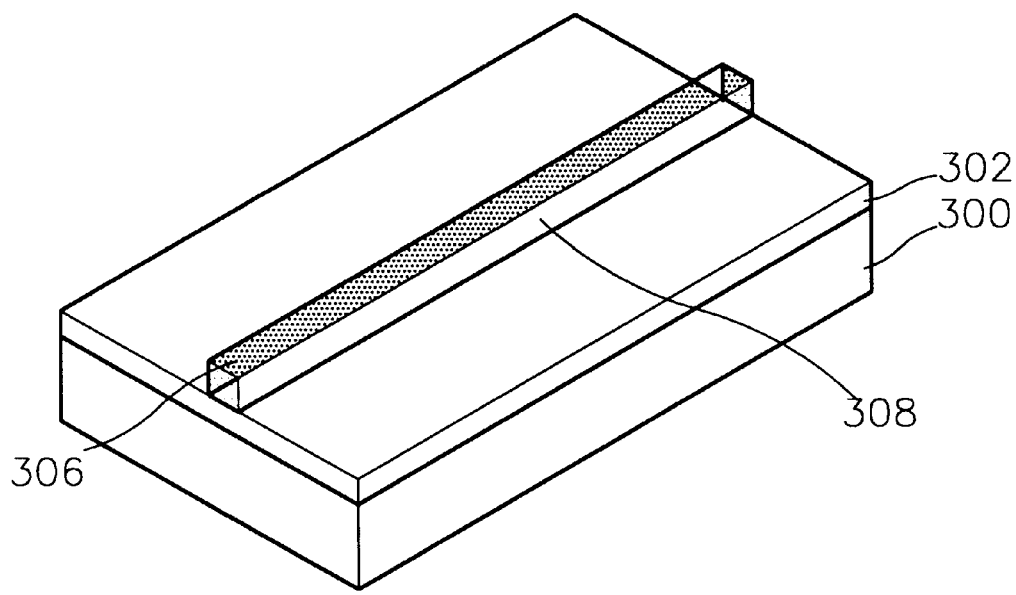
Figure 3E:
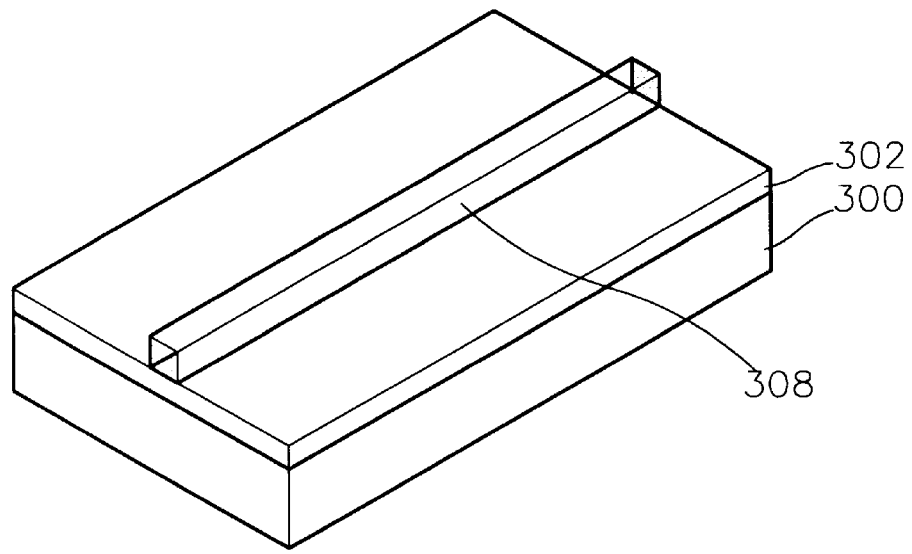
Figure 3F:
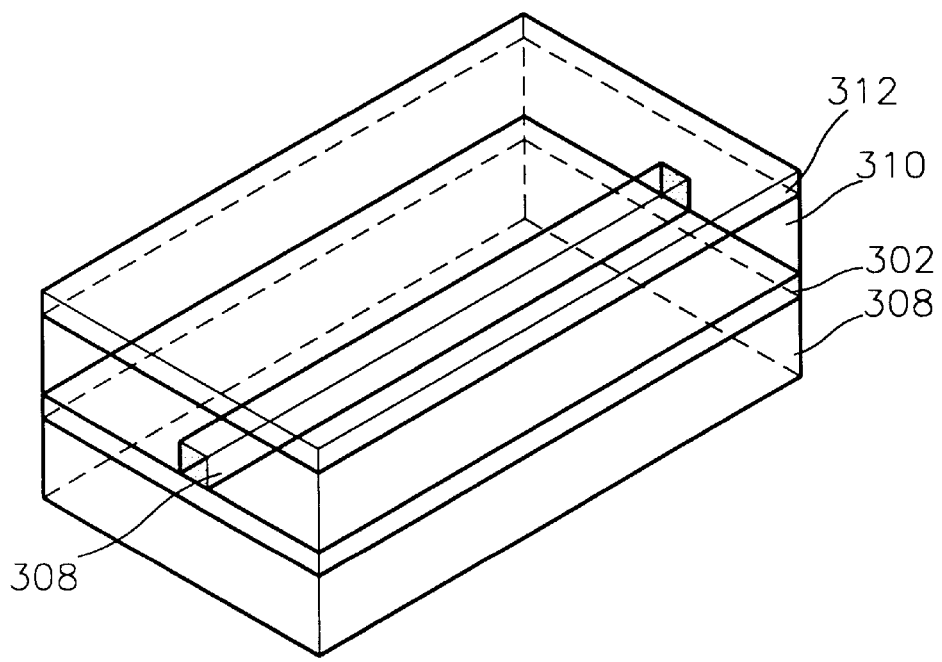

First, as shown in FIG. 3A, a lower cladding 302 is deposited on a substrate 300 by spin coating, and baked to provide a good quality film. After being baked, an optical polymer for use as a waveguide, and having a higher refractive index than the material of the lower cladding layer, is spin-coated on the lower cladding 302 to form a core layer 304, as shown in FIG. 3B. After being deposited, the optical polymer is baked to provide a good quality film. As shown in FIG. 3C, the core layer 304 is patterned by semiconductor exposure and masking exposure to form a desired waveguide pattern 306. As shown in FIG. 3D, the core layer 304 is dry etched in the shape of the pattern 306 to form a waveguide 308. As shown in FIG. 3E, a masking pattern is removed from the waveguide pattern. As shown in FIG. 3F, the same material as that of the lower cladding 302 is spincoated so as to be capable of completely covering the waveguide, thereby forming an upper cladding 310. Also, a polymer having a higher refractive index than the upper cladding 310 is spin-coated on the upper cladding 310 and is baked, thereby forming an absorption layer 312.

Figure 4:
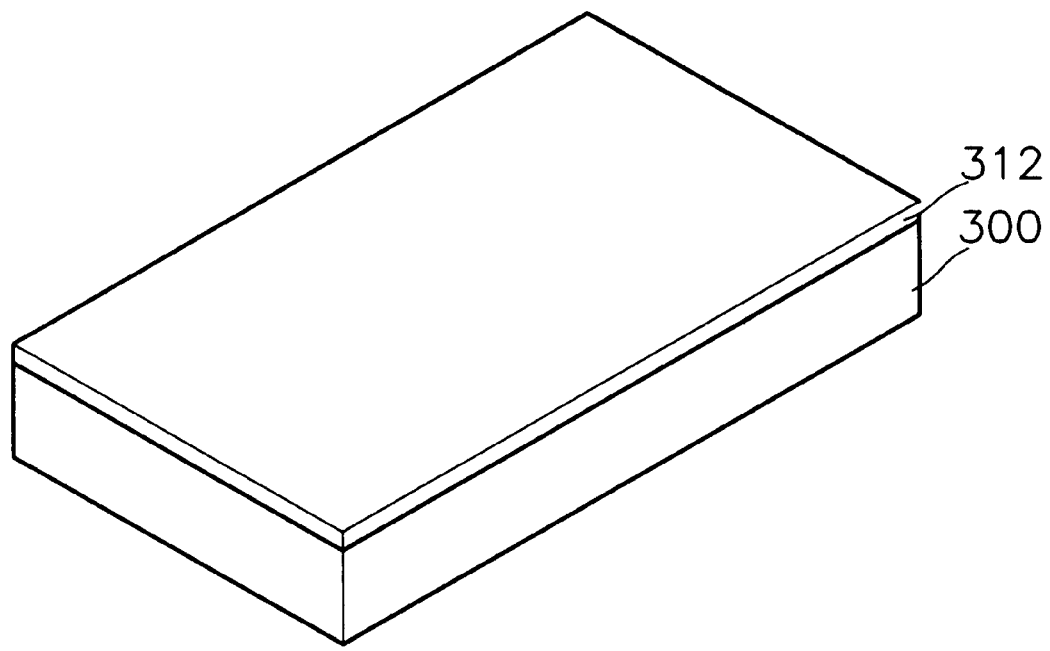
FIG. 4 is a perspective view illustrating another process for fabricating an optical waveguide for loss absorption according to the present invention.

FIG. 4 is a perspective view illustrating another process for fabricating an optical waveguide for loss absorption according to the present invention. First, the aforementioned absorption layer 312 is formed on the substrate 300. Then, the lower cladding through the upper cladding are formed on the absorption layer 312 in the same way as shown in FIGS. 3A through 3F.

The optical waveguide device fabricated as described above is completed by forming a single device via a polishing or cleaving process after a cutting process, and by pigtailing the device using an optical fiber array module or the like. The above-described absorption layer absorbs parts of light which increase reflection loss, while continuously reflecting in a space which is formed between the device and the optical fiber array module which are connected to each other, thus reducing the degree of reflection. Also, the absorption layer absorbs radiated light from a waveguide when the light travels through the waveguide.

According to the present invention, an absorption layer capable of absorbing lights is formed in a waveguide device upon fabricating an optical waveguide, thus minimizing or removing loss due to reflection and radiation of an optical signal. The absorption layer is formed on a wafer at low cost. Also, an inexpensive and commonly used material is used to form the absorption layer. Furthermore, interference due to undesired radiation of light can be reduced by characteristics which can absorb radiated light.

What is claimed is:

1. An optical waveguide device for loss absorption, comprising:
    a substrate of a predetermined material;
    a lower cladding formed on the substrate;
    an optical waveguide formed on the lower cladding, and formed from a material having a refractive index higher than a refractive index of the lower cladding;
    an upper cladding formed so as to completely cover the optical waveguide; and
    an absorption layer formed of a material having a refractive index higher than the refractive index of the upper cladding, and formed on the upper cladding to a thickness which absorbs an optical signal incident thereon.

2. The optical waveguide device for loss absorption as claimed in claim 1, wherein the absorption layer is formed of a material including no greater than 10% of a halogen family element.

3. The optical waveguide device for loss absorption as claimed in claim 1, wherein the absorption layer is formed of a material selected from the group consisting of a carboxyl functional group, a hydroxyl functional group, a primary amin functional group, and a secondary amin functional group.

4. The optical waveguide device for loss absorption as claimed in claim 1, wherein the absorption layer is at least 0.2 $\mu$m.

5. An optical waveguide device for loss absorption, comprising:
    a substrate of a predetermined material;
    an absorption layer formed on the substrate and formed to a thickness which absorbs an optical signal incident thereon;
    a lower cladding formed on the absorption layer, and formed of a material having a refractive index lower than a refractive index of the absorption layer;
    an optical waveguide formed on the lower cladding, and formed of a material having a refractive index greater than a refractive index of the lower cladding; and
    an upper cladding formed so as to completely cover the optical waveguide.

6. The optical waveguide device for loss absorption as claimed in claim 5, wherein the absorption layer is formed of a material including no greater than 10% of a halogen family element.

7. The optical waveguide device for loss absorption as claimed in claim 5, wherein the absorption layer is formed of a material selected from the group consisting of a carboxy functional group, a hydroxyl functional group, a primary amin functional group, and a secondary amin functional group.

8. The optical waveguide device for loss absorption as claimed in claim 5, wherein the absorption layer is at least 0.2 μm.

9. A method of fabricating an optical waveguide device for loss absorption, comprising the steps of:

depositing a lower cladding on a planar substrate to form a resultant structure;

depositing a core layer having a refractive index greater than a refractive index of the lower cladding on the resultant structure;

forming an optical waveguide by patterning the core layer to form a pattern and etching the core layer along the pattern;

depositing an upper cladding so as to surround the optical waveguide to form a further structure; and forming an absorption layer by depositing a material having a refractive index greater than a refractive index of the upper cladding on the further structure.

10. The method of fabricating an optical waveguide device for loss absorption as claimed in claim 9, further comprising the steps, after the depositing steps, of generating a film by means of a baking process.

11. A method of fabricating an optical waveguide device for loss absorption, comprising the steps of:

depositing an absorption layer on a planar substrate;

depositing a lower cladding on the absorption layer to form a resultant structure, said lower cladding being of a material having a refractive index lower than a refractive index of the absorption layer;

depositing a core layer having a refractive index greater than a refractive index of the lower cladding on the resultant structure;

forming an optical waveguide by patterning the core layer to form a pattern and etching the core layer along the pattern; and depositing an upper cladding to surround the optical waveguide.

12. The method of fabricating an optical waveguide device for loss absorption as claimed in claim 11, further comprising generating a good quality film after the depositing steps by means of a baking process.

13. An optical waveguide device for loss absorption, comprising:

a substrate;

a lower cladding formed on the substrate;

an optical waveguide formed on the lower cladding; and an upper cladding formed so as to completely cover the optical waveguide;

wherein said device further comprises an absorption layer disposed directly on said upper cladding and having a thickness sufficient to absorb an optical signal incident thereon.

14. The optical waveguide device as claimed in claim 13, wherein said absorption layer is disposed on said substrate.

15. The optical waveguide device as claimed in claim 13, wherein said absorption layer is formed of a material having a refractive index higher than a refractive index of said upper cladding.

16. The optical waveguide device as claimed in claim 13, wherein said optical waveguide is formed from a material having a refractive index higher than a refractive index of said lower cladding.

17. The optical waveguide device as claimed in claim 13, wherein said absorption layer is formed of a material including no greater than 10% of a halogen family element.

18. The optical waveguide device as claimed in claim 13, wherein said absorption layer is formed of a material selected from the group consisting of a carboxyl functional group, a hydroxyl functional group, a primary amin functional group, and a secondary amin functional group.

19. The optical waveguide device as claimed in claim 13, wherein the thickness of said absorption layer is at least 0.2 μm.

* * * * *